United States Patent [19]

Stalego et al.

[11] 4,312,674

[45] Jan. 26, 1982

[54] COMPOSITION AND METHOD OF PRODUCING INSOLUBLE MAG-OXY CEMENTS

[75] Inventors: Joseph P. Stalego, Newark; Ernest E. Lawson, Columbus, both of Ohio

[73] Assignee: Owens-Corning Fiberglas Corporation, Toledo, Ohio

[21] Appl. No.: 176,629

[22] Filed: Aug. 11, 1980

Related U.S. Application Data

[63] Continuation of Ser. No. 18,684, Mar. 8, 1979, abandoned.

[51] Int. Cl.³ .............................................. C04B 9/00
[52] U.S. Cl. .................................. 106/105; 106/106
[58] Field of Search ............................... 106/105, 106

[56] References Cited

U.S. PATENT DOCUMENTS

| | | | |
|---|---|---|---|
| 723,263 | 3/1903 | Gallinowsky | 106/106 |
| 771,062 | 9/1904 | Groyen | 106/106 |
| 2,351,641 | 6/1944 | Sohl et al. | 106/106 |
| 2,479,504 | 8/1949 | Moore et al. | 106/106 |
| 2,543,959 | 3/1951 | Eastin | 106/106 |
| 3,320,077 | 5/1967 | Prior | 106/106 |
| 4,141,744 | 2/1979 | Prior | 106/105 |
| 4,158,570 | 6/1979 | Irwin | 106/106 |
| 4,185,066 | 1/1980 | Temple | 106/106 |

Primary Examiner—James Poer
Attorney, Agent, or Firm—Ronald C. Hudgens; Robert F. Rywalski; William P. Hickey

[57] ABSTRACT

Mag-oxy cements are made by either molding or heat treating after molding at elevated temperatures. The products are made utilizing colloidal silica and/or phosphates and the products are made by either molding or by heat treating after molding at elevated temperatures.

The products treated at 250° F. show considerably less solubility particularly where both phosphates and silicates are present in which case the weight loss based on the reactables may be as low as approximately 2 percent. When heat treated at 300° F., there is no weight loss in practically all cases; but a pickup in weight occurs indicating an additional hydration. Sheet molding compounds are also made by processes which provide a deficiency of water of hydration.

57 Claims, 1 Drawing Figure

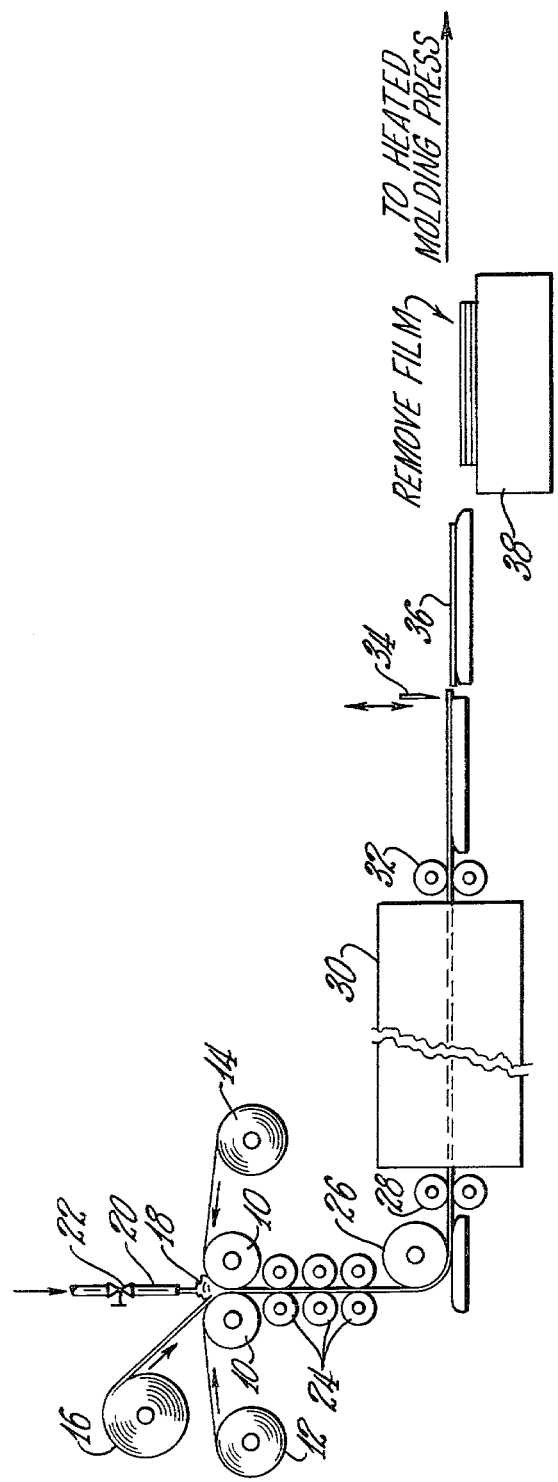

COMPOSITION AND METHOD OF PRODUCING INSOLUBLE MAG-OXY CEMENTS

This is a continuation, of application Ser. No. 018,684, filed Mar. 8, 1979, now abandoned.

BACKGROUND OF THE INVENTION

Mag-oxy cements, as for example, magnesium oxychlorides, magnesium oxysulphates, and magnesium oxycarbonates have long been known to be desirable binders which have high strength and do not burn; but in the past have had the deficiency of poor weathering characteristics. A number of attempts have been made, and patents have issued, on ways of improving the weatherability of mag-oxy cements. To my knowledge, none have truly produced an insoluble material capable of long exposure to the weather.

In the attempts which have been made to improve the weatherability of mag-oxy cements, some researchers have added silicic acid as in the Gallinowsky U.S. Pat. No. 723,263. In the Groyen U.S. Pat. No. 771,062, water glass was added. Sohl et al U.S. Pat. No. 2,351,641 appears to teach that various phosphates react with lime to prevent leaching of lime from cements, as occurs in concrete and the like. In the Moore and Watts U.S. Pat. No. 2,479,504, the addition of an acid phosphate is suggested; and the patent further indicates that a reaction between the metal oxides and the acid phosphates ensues at normal temperatures to form an insoluble phosphate. I, however, have found that acid phosphates produce products that are more soluble than when orthophosphates are used. In Eastin U.S. Pat. No. 2,543,959, one percent sodium pyrophosphate is suggested to provide a protective film around the magnesia particles to prevent them from contracting during cure. Prior U.S. Pat. No. 3,320,077 suggests that sodium hexametaphosphate is a celating agent for magnesium oxide to in turn control its hydration and reaction in forming the basic magnesium oxide cement. In all of the prior art with which I am familiar, a reaction of magnesium oxide with magnesium chloride, magnesium sulphate, or a carbonate is carried out in an aqueous medium at atmospheric temperatures. In checking the reactions of the materials suggested by the prior art, however, I have found none that give a truly insoluble cement.

An object of the present invention, therefore, is the provision of a new and improved mag-oxy cement, and method of making same, which is nonleachable, and which has sufficiently good weathering properties that it can be used as a binder for glass fibers to produce a material comparable in strength, durability, and weatherability to that of the polyester resins.

Another object of the invention is the provision of a new and improved method of making mag-oxy molding compounds which will give products of increased durability.

Further objects and advantages of the invention will become apparent to those skilled in the art to which the invention relates from the following description of the preferred embodiments.

BRIEF DESCRIPTION OF THE DRAWINGS

The solitary FIGURE is a schematic elevational view for making sheet molding compounds of materials of the present invention.

DESCRIPTION OF THE PREFERRED EMBODIMENTS

According to principles of the present invention, I have discovered that if reactive amounts of colloidal silica and/or reactive phosphates, preferable orthophosphates, are reacted with mag-oxy cements forming materials at temperatures above 250° F., or are post cured above temperatures of 250° F., a great decrease in solubility of the resulting material is had. I have further found that if both a phosphate and collodial silica are present, the temperature at which a nonsoluble material is produced is lower than when either the colloidal silica or the phosphate alone is used as an additive to the mag-oxy cement forming material. The water softening phosphates, as have been known heretofore, are principally retarders for the setting reaction, and are useful for that purpose. Acid phosphates generally do not produce the most insoluble materials even when reacted at the elevated temperatures. Nevertheless, their weatherability is improved if they are reacted or post cured at the elevated temperatures. In general, temperatures above approximately 250° F. for a number of minutes, usually five or more should be used, and temperatures of 350° F. or 400° F. may be required for compositions where only colloidal silicas are utilized as the additive. I have further found that an advantage is had by molding the materials at temperatures of 300° F. or more in that the material so formed are dense and do not crack during subsequent heat treatment. Applicant's preferred embodiment, therefore, is a molding at the elevated temperatures with sufficient silica and/or phosphate, and preferably both, being present to provide insolubility for the particular mixture used.

Fillers, of course, can be used, and in this regard, amorphous silica seems to have a surface reaction with the cement forming materials, particularly when colloidal silica is used, and is therefore to be preferred. Glass fiber reinforcing seems to have a surface reaction with colloidal silica and phosphates to give increased strength over mag-oxy forming materials devoid of the colloidal silica and/or phosphate.

The above principles will be made clear from the following examples.

EXAMPLE 1

A batch composition was made from the following ingredients in parts by weight:

| Ingredients | Parts by Weight |
| --- | --- |
| Magnesium oxide | 210 |
| Magnesium chloride | 180 |
| Phosphoric acid | 3 |
| Sodium hexametaphosphate | 1 |
| Water | 150 |
| Aluminum phosphate | 50 |
| Amorphous silica | 290 |
| Colloidal silica (Ludox (HS-40) | 50 |

The above materials were thoroughly mixed into a homogeneous mixture, and were reinforced with glass fibers according to the following procedure.

One ply of commercial glass fiber veil mat followed by one ply of continuous strand swirl mat weighing 1.5 ounces per square foot were placed on a five inch by ten inch by ⅛ inch deep sheet mold heated to 210° F. The homogeneous slurry above described was poured over the mats, and a second ply of the swirl mat and a second ply of the veil mat were placed over the slurry. This assembly was placed into a press and cured for four minutes at 210° F., under a pressure of 400 pounds per square inch. The flat test specimens so produced were removed from the mold, and subjected to 2,000 hours of weathering in a Xenon Arc Weatherometer. The samples so tested showed no loss of weight due to leaching, no color change due to the ultraviolet light, and no cracking, crazing, or blooming.

In the Xenon Arc Weatherometer, the test specimens are so suspended on a drum in a vertical position, and are rotated at the rate of 1 RPM. The black body temperature of the weatherometer is maintained at a steady 145° F. plus or minus five degrees F. The test specimens are subjected to 18 minutes of water spray and 102 minutes of drying condition during each 120 minute weathering cycle. The Xenon arc light is on continuously during the 120 minute cycle. Distilled water at a temperature of 60° F. is sprayed onto the samples at a rate of 1.84 pints of water per minute to hit the samples once per revolution during the 18 minute period. It is said that exposure to 350 hours to Xenon arc light is approximately equal to one year exposure to natural sunlight in Jacksonville, Fla.

EXAMPLE 2

The process of Example 1 is repeated except that calcium phosphate is substituted for the aluminum phosphate and the same results are obtained.

EXAMPLE 3

The process of Example 1 is repeated excepting that the following composition is utilized.

| Ingredients | Parts by Weight |
|---|---|
| Magnesium oxide | 210 |
| Magnesium chloride | 180 |
| Water | 150 |
| Magnesium carbonate | 150 |
| Imsil 108 Amorphous silica | 240 |
| Union Carbide R270 Silicone | 24 |

The test panels, after 2,000 hours of exposure in a Xenon Arc Weatherometer showed only a slight subtle change in appearance with no crazing, cracking, or erosion.

EXAMPLE 4

The process of Example 1 is repeated using the following composition.

| Ingredients | Parts by Weight |
|---|---|
| Magnesium oxide | 210 |
| Magnesium chloride | 180 |
| Water | 177 |
| Barium carbonate | 390 |

The test panel, after 2,000 hours of exposure in the Xenon Arc Weatherometer showed only a slight subtle surface change with no crazing, cracking, or apparent leaching.

The following is a table of compositions all of which gave the same good resistance to weathering as occured in Examples 2-4, and is designated Table 1.

TABLE 1

| | Example Number | | | | | | | | | | | | |
|---|---|---|---|---|---|---|---|---|---|---|---|---|---|
| | 5 | 6 | 7 | 8 | 9 | 10 | 11 | 12 | 13 | 14 | 15 | 16 | 17 |
| Material | Molding Slurry Compositions (parts/wt)[2] | | | | | | | | | | | | |
| Magnesium Oxide | 210 | 55 | 55 | 210 | 210 | 210 | 210 | 210 | 210 | 210 | 210 | 210 | 210 |
| Magnesium Chloride | 180 | 45 | 45 | 180 | 180 | 180 | 180 | 180 | 180 | 180 | 180 | 180 | 180 |
| Water | 150 | 130 | 125 | 150 | 150 | 150 | 150 | 150 | 120 | 150 | 150 | 150 | 150 |
| Aluminum Phosphate | — | — | 246 | 50 | 50 | — | 50 | — | — | — | 50 | — | — |
| Calcium Phosphate | 50 | — | — | — | — | 50 | — | — | — | 50 | — | 50 | 50 |
| Imsil 108 Silica | 290 | 246 | — | 290 | 290 | 290 | 290 | 310 | — | 290 | 290 | 290 | 290 |
| Magnesium Carbonate | — | — | — | — | — | — | — | — | 195 | — | — | — | — |
| Ludox HS 40 | 50 | 47 | 47 | 50 | 50 | 50 | 50 | — | — | 50 | 25 | 25 | 50 |
| Ludox AM | — | — | — | — | — | — | — | 80 | — | — | — | — | — |
| Hydrophobing Agent | 24[3] | — | — | 24[3] | 24[4] | 24[5] | 24[5] | 24[5] | — | 24[4] | 12[6] | 12[6] | 24[7] |
| WEATHERING RATING[1] | 1 | 1 | 2 | 1 | 1 | 1 | 1 | 1 | 1 | 1 | 1 | 1 | 1 |

[1]Weathering Ratings as determined by Exploratory Research Personnel: 0 = no change, 1 = a distinguishable, subtle change that is vaquely apparent but not visible, 2 = slight change, 3 = partial change, 4 = considerable change, 5 = extreme change.
[2]All compositions also contain 3 parts phosphoric acid and one part sodium hexametaphosphate Glass reinforcement = 20% wt. (2 plies of continuous strand mat for ⅛" thick panel) Cure cycle - 4 minutes Curing temp. - 210° F. Molding pressures: 600 psi for example 6; 800 psi for examples 17, 10, 11, 14, 9, 16, 15, 5, 8, and 12, 1,200 psi for example 7.
[3]Dow Corning 770 Silicone
[4]Union Carbide R27 Silicone
[5]Union Carbide R270 Silicone
[6]Dow Corning 772 Silicone
[7]Quilon (Tradename)

TABLE 2

| | Example Number | | | | | | | | |
|---|---|---|---|---|---|---|---|---|---|
| | 18 | 19 | 20 | 21 | 22 | 23 | 24 | 25 | 26 |
| Ingredients | CONTROL | | 150 GRAMS WATER | | | 200 GRAMS WATER | | NO PHOSPHATES | |
| Magnesium oxide | 210 | 210 | 210 | 210 | 210 | 210 | 210 | 110 | 110 |
| Magnesium chloride | 180 | 180 | 180 | 180 | 180 | 180 | 180 | 90 | 90 |
| Phosphoric acid | 3 | 3 | 3 | 3 | 3 | 3 | 3 | 3 | 3 |
| Na Hexametaphosphate | 1 | 1 | 1 | 1 | 1 | 1 | 1 | 1 | 1 |
| Water | 77 | 77 | 150 | 150 | 150 | 200 | 200 | 75 | 75 |
| Calcium phosphate | | | 50 | 50 | 50 | 50 | 50 | | |
| Amorphous silica (Imsil 108) | | | 290 | 290 | 290 | 290 | 290 | 148 | 148 |

TABLE 2-continued

| | | | | | | | | |
|---|---|---|---|---|---|---|---|---|
| Colloidal silica (Ludox H.S. 40) | | | 50 | 50 | 50 | 50 | 50 | 47 | 47 |
| Dow Corning 770 silicone | | | 24 | 24 | 24 | 24 | 24 | | |

| HOT WATER PERCENT EXTRACTABLES* | | | | | | | | | |
|---|---|---|---|---|---|---|---|---|---|
| As produced | −17.17 | −17.84 | −12.39 | −9.87 | −12.55 | −13.19 | −17.83 | −11.29 | −12.60 |
| 250° F. heat treatment | −11.13 | −11.56 | | −0.98 | −1.70 | −3.78 | −4.65 | −2.90 | −3.39 |
| 300° F. heat treatment | −9.82 | −8.59 | +1.87 | +2.80 | +2.28 | +0.52 | −0.27 | 0.0 | +0.76 |
| 350° F. heat treatment | −5.97 | −6.30 | | | +2.50 | −0.049 | −0.33 | +0.44 | +0.91 |
| 400° F. heat treatment | −5.85 | −3.98 | +2.22 | +3.53 | +2.96 | +0.19 | +1.14 | +0.43 | +0.54 |

| | Example Number | | | | | | | | |
|---|---|---|---|---|---|---|---|---|---|
| | 27 | 28 | 29 | 30 | 31 | 32 | 33 | 34 | 35 |
| Ingredients | CONTROL | | PHOSPHATE | | COLLOIDAL SILICA | | BOTH | | PHOSPHATE |
| Magnesium oxide | 400 | 400 | 400 | 400 | 400 | 400 | 400 | 400 | 110 |
| Magnesium Chloride | | | | | | | | | 90 |
| Phosphoric acid | | | | | | | | | 3 |
| MgSO$_4$ · 7H$_2$O | 400 | 400 | 400 | 400 | 400 | 400 | 400 | 400 | |
| Na Hexametaphosphate | 4 | 4 | 4 | 4 | 4 | 4 | 4 | 4 | 1 |
| Water | 132 | 132 | 260 | 260 | 200 | 200 | 245 | 245 | 50 |
| Calcium phosphate | | | 80 | 80 | | | 80 | 80 | 50 |
| Colloidal silica (Ludox H.S. 40) | | | | | 100 | 100 | 100 | 100 | |
| OCF 710G ¼″ strands | 5 | 5 | 5 | 5 | 5 | 5 | 5 | 5 | 5 |

| HOT WATER PERCENT EXTRACTABLES* | | | | | | | | | |
|---|---|---|---|---|---|---|---|---|---|
| As produced | −11% | −10% | −8% | −8% | −14% | −14% | −8% | −10% | −14.66 |
| 250° F. heat treatment | −15% | −14% | −7% | −6% | −16% | −17% | −6% | | −14.23 |
| 300° F. heat treatment | −5% | −4% | −2% | −3% | −6% | −6% | −5% | −4% | −16.84 |
| 350° F. heat treatment | −3% | −3% | +3% | +4% | −5% | −5% | +6% | +4% | −18.44 |
| 400° F. heat treatment | −3% | −3% | +2% | +1% | −4% | −3% | +6% | +3% | −19.18 |

*minus = % weight loss; plus = % weight gain

The preceding table 2 of examples gives data concerning compositions which were molded according to the procedure of Example 1 at a mold temperature of 210° F. for four minutes. The first two examples under the heading "control" give formulations of mag-oxy without the addition of phosphates or colloidal silica. Instead of testing these samples in the Xenon Weatherometer, however, they were tested by immersing in boiling water for three and a half hours followed by air drying overnight, and then drying in an oven that was maintained at 225° F. for one and a half hours.

Under the heading "Hot water percent extractables", the "as produced" line indicates the percent weight loss due to leaching of the molded examples. In addition to the "as produced" samples, other samples of the compositions were molded and were given a further heat treatment; some at 250° F., some at 300° F., some at 350° F., and some at 400° F., before the extraction test. The percent extractables given in the lines labeled with the various heat treatments are based on the weight before and after the boiling and drying steps. This table shows that all mag-oxy cements, with and without the additions of calcium phosphate and/or colloidal silica, become less leachable when the materials are heated to temperatures above approximately 250° F. The table also shows that when either colloidal silica or reactive orthophosphates are reacted into the mag-oxy cements, the heat treatment will make them practically insoluble.

The table also shows that when both the colloidal silica and reactive orthophosphates are reacted into the mag-oxy cements, the temperature at which the materials become insoluble is lowered. Other work which has been done seems to indicate that the acid phosphates react in a manner similar to that of the nonacid orthophosphates, but that in general they are more soluble and are not preferred for this reason. The acid phosphates, however, may have utility in some instances, and the principles relating to decreasing their solubility applies to mag-oxy cements which incorporate acid phosphates, also.

In the examples which have been given heretofore, phosphoric acid has been utilized to improve the smoothness and viscosity of the original slurries. The sodium hexametaphosphate has been incorporated as a water softener and as a retarder for the hydration reaction. Some prior art seems to indicate that the sodium hexametaphosphate are chelating agents for magnesium oxide, and this may be so. Other work done by applicant indicates that any nonacid orthophosphate can be substituted for the calcium phosphate with generally similar results. Amorphous silica has been utilized as a filler because of its fine partical size. Applicant believes that amorphous silica is not completely inert, and that there is some beneficial reaction with colloidal silicas and phosphates which give increased bond strength to the mag-oxy materials formed. The silicones were used in the examples since it was thought that they would decrease wettability of the molded parts; but the data shows that they are not necessary. There is every reason to believe that temperatures above 400° F. can be used, either as a post treatment after molding, or as the molding temperature, since it appears that the effect of the increased temperatures is to cause the lower hydrates to be formed. The cements decrease in solubility as the water of crystallization of the mag-oxy cement decreases.

Having made the discoveries above described, examination of known compounds shows that magnesium orthophosphate having 22 molecules of water of crystallization will lose 18 molecules of water at 100° C. to form the tetrahydrate. The orthophosphate having 22 molecules of water attached is slightly soluble in cold water. The orthophosphates having fewer molecules of water are progressively less soluble. To my knowledge, the prior art has not molded magnesium oxy cements above 212° F., at least when orthophosphates are present. A search of the literature also shows that magnesium orthophosphate having no water of crystallization is insoluble. Applicant believes that the mag-oxy cements are similar in nature and will decrease in solubility as they are molded at higher temperatures. It is believed that mag-oxy cements would require temperatures considerably higher than when the orthophosphates are present, and perhaps never will be as insoluble as are the materials containing the orthophosphates.

The solubility of the acid phosphates given in the literature is appreciable when they contain more than approximately 3 molecules of water per molecule, and they similarly decompose at temperatures, which become progressively higher as the number of molecules of water decreases. For example, the magnesium acid phosphate containing seven molecules of water requires a temperature of 100° C. to convert to the tetrahydrate. The magnesium acid phosphate containing three molecules of water requires a temperature of 205° C. to convert to a lower hydrate having two molecules of water.

It appears that magnesium meta and orthosilicates are all insoluble when they are devoid of water of crystallization, and it is believed that they undergo a similar loss of water of crystallization, as is known occurs with opals, etc. Applicant has noticed an improvement in weatherability when he used both the phosphate and colloidal silica, and it is believed that the addition of both phosphate and silica lowers the formation temperature of the lower hydrates below that which would occur when only the phosphate or only the silicate is present. In most instances, it is desired to mold at as low a temperature as possible, and therefore, the inclusion of both of the phosphates and the colloidal silica will be beneficial. The amounts of each may be optimized when cost considerations are involved.

Both bulk molding compounds and sheet molding compounds can be made from the mag-oxy compositions by incorporating chopped glass strand as is done with polyester resins. A preferred usage of the binders of the present invention is that of the binder for a sheet molding compound to replace polyester resins, since the mag-oxy cements have comparable strengths and do not burn. FIG. 1 of the drawings shows a typical process by which the slurries of the present invention can be used to produce sheet molding compound.

The apparatus shown in FIG. 1 for producing sheet molding compound generally comprises a pair of compression rolls 10 which are set a predetermined distance apart so that the nip therebetween provides a desired thickness of sheet molding compound. Layers of paper from the rolls 12 and 14 are fed over the respective compression rolls 10, and a glass fiber swirl mat from the roll 16 is fed down into the nip between the paper sheets 12 and 14. A mag-oxy cement forming slurry 18 is fed into the nip of the rolls 10 from a supply of the slurry indicated by the pipe 20 and control valve 22. The nip is flooded with the slurry and the amount is regulated to prevent the slurry from overflowing the rolls 10. The sandwich comprising the paper sheets 12 and 14, reinforcing mat 16, and the slurry passes down between three pair of kneading rolls 24 having raised rings thereon that are mismatched to work the materials of the sandwich laterally and cause the slurry to completely surround and wet out the fibers of the mat 16. Thereafter, the sandwich rolls around a direction changing roll 26 to pass between a pair of pull rolls 28 which feed the sandwich into an oven 30. The oven has a temperature of approximately 210° F. to remove standing or excess water from the sandwich. Another pair of pull rolls 32 are positioned at the outlet of the oven 30 for pulling the sandwich from the oven and feeding it to a transverse sheer, shown schematically at 34. The vertically reciprocating sheer 34 cuts lengths of the sheet molding compound to a desired length for making a particular size of molded object. The sheets 36 of molding compound are moved to a station 38 where the sheets of porous paper are removed and following which the sheet molding compound is fed to a press heated to a temperature of 250° F. or more, to produce the desired molded object.

In those instances where the sandwich which forms the sheet molding compound is to be stored for extended periods of time prior to molding, the oven 30 may be lengthened, so that all free water from the sheet molding compound is removed, and so that the mag-oxy cements either forms a dry very high hydrate, or an incompletely hydrated product. Depending upon the amount of water that was used in the slurry, and the thickness and rate of drying of the sheet molding compound, additional water can be added to the sheet molding compound just before placing it into the press. This can preferably be done by steam either before or during molding. It will be remembered that water of crystallization is removed either by the molding process of the present invention or by a subsequent heat treatment, so that some of the necessary water to complete the finished hydrated product will come from decomposition of the highly hydrated materials. In the most preferred embodiment, the decomposition of the highly hydrated materials occurs in the press, so that a very dense molded product is obtained without the risk of subsequent weakening due to the removal of water of crystallization in a subsequent heat treatment. These elements of applicant's process are believed important, and are mentioned to support claims to these details. It is clear that elevated temperatures cause the mag-oxy cements that are produced to be less soluble. It further appears that the addition of colloidal silica and phosphates lower the temperatures of the phases produced as would be indicated in a phase diagram. The addition of both phosphates and colloidal silica appear to produce the ultimate lowering of the phase diagram. Physical chemists know that the amount of lowering of the temperatures in a phase diagram are generally proportional to the amounts of added reactants used to modify the basic phases; and so no attempt has been made to optimize these percentages. It is not known precisely at what temperature $3MgO \cdot MgCl_2 \cdot 11H_2O$ decomposes, but decomposition is believed to occur at temperatures of approximately 300° F. or above to form lower hydrates which are still soluble. Apparently, a truly insoluble mag-oxy cement cannot be made at any temperature without the addition of either phosphates or colloidal silica, although improvement is had.

Referring to Table 2, the solubility of reactables having a heat treatment of 250° F. are as low as approximately 2 percent when phosphates or colloidal silica are incorporated. At 300° F., however, there is no loss; but on the other hand, further hydration appears to take place when boiled in water. This fact can be utilized to produce a desired expansion, either prior to or during usage, which would offset all crazing and cracking. When no phosphates are added and only the colloidal silica is used, there still is a slight solubility at 300° F. With a heat treatment at 350° F., unmodified mag-oxy cements have an appreciable solubility whereas those that are modified either with silicates alone or phosphates alone appear to be insoluble. It appears that a major discovery has been made in this field and that mag-oxy cements which are not only insoluble but which will expand slightly with weathering, can be made. What has been said with respect to mag-oxy cements utilizing the carbonates and chlorides is also applicable to the mag-oxy sulphates as is shown by Examples 27 through 34.

While the invention has been described in considerable detail, I do not wish to be limited to the particular embodiments shown and described; and it is my intention to cover hereby all novel adaptations, modifications, and arrangements thereof, which come within the practice of those skilled in the art to which the invention relates and which fall within the purview of the following claims.

I claim:

1. A magnesium oxide cement modified by having sufficient orthophosphate present and incorporated into its structure by heating at temperatures above approximately 250° F. so that it has a solubility of less than 2 percent in boiling water.

2. A magnesium oxide cement modified by having sufficient orthophosphate incorporated therein and cured at a sufficiently elevated temperature to give no measurable weight loss in the standard Xenon Arc Weatherometer test.

3. A magnesium oxide cement modified by having sufficient phosphate solids reacted therein at a sufficiently elevated temperature that it has substantially no loss after 3 hours in boiling water.

4. The magnesium oxide cement of claim 3 cured at a temperature of at least 250° F.

5. The magnesium oxide cement of claim 4 having an amorphous silica filler.

6. A magnesium oxide cement formed by the reaction product of colloidal silica, magnesium oxide cement forming materials and sufficient phosphate at a sufficiently elevated temperature and for a sufficient period of time to have substantially no weight loss when boiled in water for 3½ hours.

7. The cement of claim 6 wherein the phosphate is an orthophosphate.

8. A magnesium oxide cement formed by reacting colloidal silica, magnesium oxide cement forming materials and sufficient phosphate at a sufficiently elevated temperature and for a sufficient period of time to have substantially no weight loss when boiled in water for 3½ hours.

9. The cement of claim 8 having an amorphous silica extender.

10. The cement of claim 8 wherein the magnesium oxide cement forming materials are magnesium oxide and magnesium chloride.

11. The cement of claim 8 wherein its magnesium oxide forming materials are magnesium oxide and magnesium sulphate.

12. A magnesium oxide cement formed by the reaction produced of phosphate and magnesium oxide cement forming materials reacted at a sufficiently elevated temperature for a sufficient period of time to have substantially no weight loss when boiled in water.

13. The cement of claim 12 having an amorphous silica extender.

14. The cement of claim 12 wherein the magnesium oxide cement forming materials are magnesium oxide and magnesium chloride.

15. The cement of claim 12 wherein its magnesium oxide cement forming materials are magnesium oxide and magnesium sulphate.

16. The cement of claim 12 wherein the phosphate is an orthophosphate.

17. The cement of claim 16 molded under pressure at a temperature above approximately 250° F.

18. The cement of claim 8 molded under pressure at a temperature above approximately 250° F.

19. The cement of claim 18 wherein the cement is the reaction product of colloidal silica, orthophosphates, and magnesium oxide cement forming materials.

20. A partially hydrated molding compound comprising inorganic fibers and magnesium oxide cement binder forming materials that include sufficient orthophosphate to give a product having substantially no weight loss in boiling water when the product is cured above 300° F.

21. The molding compound of claim 20 wherein the binder forming materials include sufficient phosphates to react with the magnesium oxide forming materials to lower their hydrate decomposition temperatures.

22. The molding compound of claim 20 wherein the binder forming materials include sufficient colloidal silica to react with the magnesium oxide forming materials and lower their hydrate decomposition temperatures.

23. The molding compound of claim 21 wherein the water present is less than eleven moles per amount of material forming one mole of magnesium oxide cement.

24. The molding compound of claim 22 wherein the water present is less than eleven moles per amount of material forming one mole of magnesium oxide cement.

25. The molding compound of claim 20 wherein the binder forming materials include both colloidal silica and phosphates to react with the magnesium oxide forming materials and lower their hydrate decomposition temperatures.

26. The molding compound of claim 25 wherein the water present is less than eleven moles per amount of material forming one mole of magnesium oxide cement.

27. The process of producing magnesium oxide cements including: heating either the hydrated cement product or the cement forming ingredients in the presence of sufficient orthophosphate and at a sufficiently elevated temperature and for a sufficient time to produce a cement having less water of crystallization than that of the same product produced at room temperature.

28. The process of claim 27 wherein the cement has less than eleven molecules of water per magnesium oxide cement molecule.

29. The process of claim 27 including the step of: reacting sufficient colloidal silica with the magnesium oxide forming material to reduce the temperature at which insoluble cements are formed.

30. The process of claim 27 including the step of reacting sufficient phosphates with the magnesium oxide forming material to reduce the temperature at which insoluble cements are formed.

31. The process of claim 27 including the step of reacting sufficient colloidal silica with the magnesium oxide cement forming materials to make the cement generally insoluble in boiling water.

32. The process of claim 27 including the step of reacting sufficient phosphates with the magnesium oxide cement forming materials to make the cement generally insoluble in boiling water.

33. The process of claim 27 wherein the heating step is performed in a press at a temperature above approximately 250° F.

34. The process of producing a molding compound comprising intimately mixing magnesium oxide cement forming materials with water to form a paste, and drying the paste before complete crystallization takes place.

35. The process of claim 34 including the step of: molding the compound under sufficient heat and pressure to form a cement of the lower hydrates.

36. The process of claim 34 including the step of: adding water to the molding compound and molding under heat and pressure.

37. The process of claim 34 including the step of: adding sufficient colloidal silicate and phosphates to lower the formation temperatures of at least some of the hydrates to be formed.

38. The process of claim 34 including the step of: molding the materials under sufficient heat and pressure to form a crystalline phase having less than eleven molecules of water per molecule of the phase.

39. The process of claim 38 including the step of: wetting the molding compound after the drying step and before the molding step is completed.

40. The process of claim 39 including the step of: incorporating sufficient colloidal silica to the molding compound to produce a substantially insoluble product.

41. The process of claim 39 including the step of: incorporating sufficient phosphates to the molding compound to produce a substantially insoluble product.

42. The process of claim 39 including the step of: incorporating sufficient colloidal silica and phosphates that the insoluble phase can be produced at a temperature less than approximately 400° F.

43. The process of producing magnesium oxide cement articles comprising: mixing magnesium oxide cement forming materials, wetting the materials with less water than that which is necessary to form a hydrate at room temperature, hydrating and storing the partially hydrated materials, and molding the materials under heat and pressure with the addition of sufficient water to complete the desired hydration.

44. The process of claim 43 wherein the addition of water is supplied by steam.

45. The process of claim 43 wherein colloidal silica and phosphates are added and reacted with the magnesium oxide cement forming materials in sufficient amounts to lower the temperature at which the eleven molecule hydrate decomposes and a lesser hydrate is formed.

46. The method of making sheet molding compound comprising: mixing sufficient water with magnesium oxide cement forming materials to form a slurry, incorporating a reinforcement into the slurry, forming a sheet of the slurry and reinforcement, and drying the slurry before complete hydration of the magnesium oxide cement to the extent necessary to stop further hydration and permit storage.

47. The method of claim 46 including the step of: incorporating sufficient reactive phosphates into the slurry so that the sheet molding compound will form lower hydrates at temperatures below approximately 400° F.

48. The method of claim 46 including the step of: incorporating sufficient colloidal silica into the slurry so that the sheet molding compound will form lower hydrates at temperatures below approximately 400° F.

49. The method of claim 46 including the step of: incorporating sufficient phosphates and colloidal silica into the slurry so that the sheet molding compound will form lower hydrates at temperatures below approximately 400° F.

50. The process of producing sheet molding compound comprising: mixing magnesium oxide cement forming materials with insufficient water to form the eleven molecule hydrate, incorporating a reinforcement into the mixture, and forming a generally uniformly thick layer of the partially hydrated mixture to form a sheet molding compound.

51. The method of claim 50 including the step of: incorporating sufficient reactive phosphates into the slurry so that the sheet molding compound will form lower hydrates at temperatures below approximately 400° F.

52. The method of claim 50 including the step of: incorporating sufficient colloidal silica into the slurry so that the sheet molding compound will form lower hydrates at temperatures below approximately 400° F.

53. The method of claim 50 including the step of: incorporating sufficient phosphates and colloidal silica into the slurry so that the sheet molding compound will form lower hydrates at temperatures below approximately 400° F.

54. A sheet molding compound comprising a reinforcement incorporated in magnesium oxide cement forming materials, said materials incorporating less water than necessary to form the eleven molecule hydrate of the materials.

55. The sheet molding compound of claim 54 incorporating sufficient phosphates to cause the materials to form lower hydrates below approximately 400° F.

56. The sheet molding compound of claim 54 incorporating sufficient colloidal silica to cause the materials to form lower hydrates below approximately 400° F.

57. The sheet molding compound of claim 54 incorporating sufficient phosphates and colloidal silica to cause the materials to form lower hydrates below approximately 400° F.

* * * * *